(12) United States Patent
Thompson

(10) Patent No.: US 10,239,437 B2
(45) Date of Patent: Mar. 26, 2019

(54) LOAD BINDER SYSTEMS

(71) Applicant: David John Thompson, Greenacres, WA (US)

(72) Inventor: David John Thompson, Greenacres, WA (US)

( * ) Notice: Subject to any disclaimer, the term of this patent is extended or adjusted under 35 U.S.C. 154(b) by 330 days.

(21) Appl. No.: 15/041,940

(22) Filed: Feb. 11, 2016

(65) Prior Publication Data

US 2017/0232881 A1 Aug. 17, 2017

(51) Int. Cl.
  *B60P 7/08* (2006.01)

(52) U.S. Cl.
  CPC ................... *B60P 7/0823* (2013.01)

(58) Field of Classification Search
  CPC ......... B60P 7/08; B60P 7/0853; B60P 7/0823; B60P 7/083; B60P 7/0838
  See application file for complete search history.

(56) References Cited

U.S. PATENT DOCUMENTS

| | | | | |
|---|---|---|---|---|
| 3,065,007 A * | 11/1962 | Colmer, Jr. | ............. | F16G 11/12 24/279 |
| 5,971,178 A * | 10/1999 | Ratcliff | .................... | B66D 3/18 212/250 |
| 6,945,516 B1 * | 9/2005 | Scott | ....................... | B60P 7/083 254/231 |
| 8,434,979 B1 * | 5/2013 | Genge | ..................... | B60P 7/083 410/103 |
| 9,610,883 B1 * | 4/2017 | Mahaffey | ................. | F16G 11/12 |
| 9,776,550 B2 * | 10/2017 | Mahaffey | ................. | F16M 7/00 |
| 2008/0118324 A1 * | 5/2008 | Fritel | ...................... | F16G 11/12 410/100 |
| 2010/0284757 A1 * | 11/2010 | Numata | ................ | B60P 7/0823 410/103 |
| 2012/0233824 A1 * | 9/2012 | Breeden | ................... | B60P 7/083 24/68 CD |
| 2014/0109361 A1 * | 4/2014 | Helline | ................... | B60P 7/083 24/68 CD |
| 2016/0046228 A1 * | 2/2016 | Williams | .............. | B60P 7/0846 410/98 |
| 2016/0195165 A1 * | 7/2016 | Chou | ...................... | F16G 11/12 74/88 |
| 2017/0355298 A1 * | 12/2017 | Cahall | .................. | B60P 7/0853 |

OTHER PUBLICATIONS

"Speedbinder brochure", Speedbinders.com, retrieved on Dec. 1, 2015 at <<http://www.speedbinders.com/docs/speedbinder-brochure.pdf>>, 2 pages.

* cited by examiner

*Primary Examiner* — Michael E Gallion
(74) *Attorney, Agent, or Firm* — Lee & Hayes, P.C.

(57) ABSTRACT

A binder includes a right angle drive including a driving gear interfacing with a driven gear. A receptacle arranged substantially at a center of a diameter of the driving gear can receive a bit of a power driver. The bit of the power driver removeably received by the receptacle arranged at the center of the driving gear can rotate a threaded gear tube relative to the first and second threaded rods to linearly displace the first and second threaded rods of the binder to tension a tensionable load bearing member and lock the binder.

16 Claims, 3 Drawing Sheets

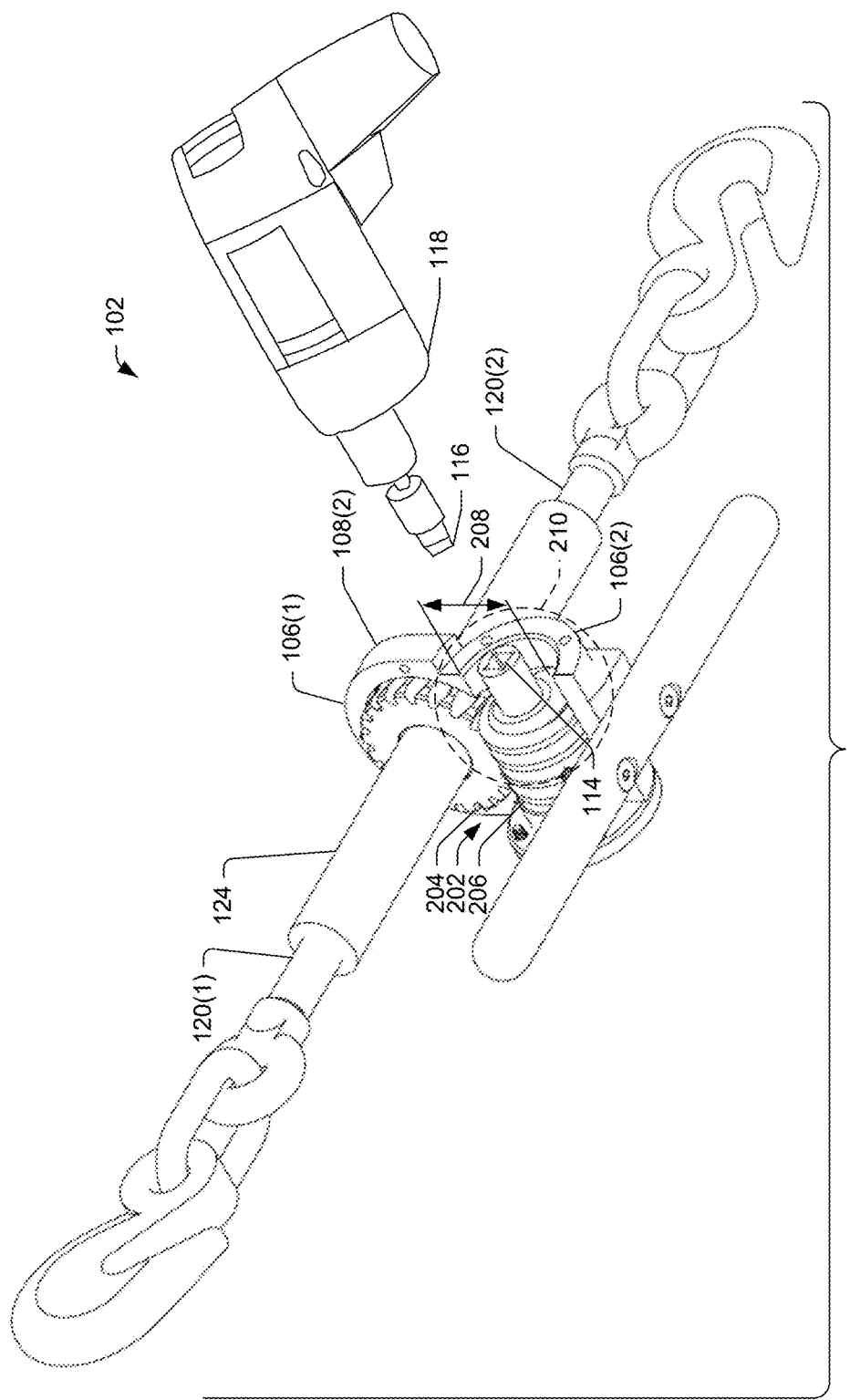

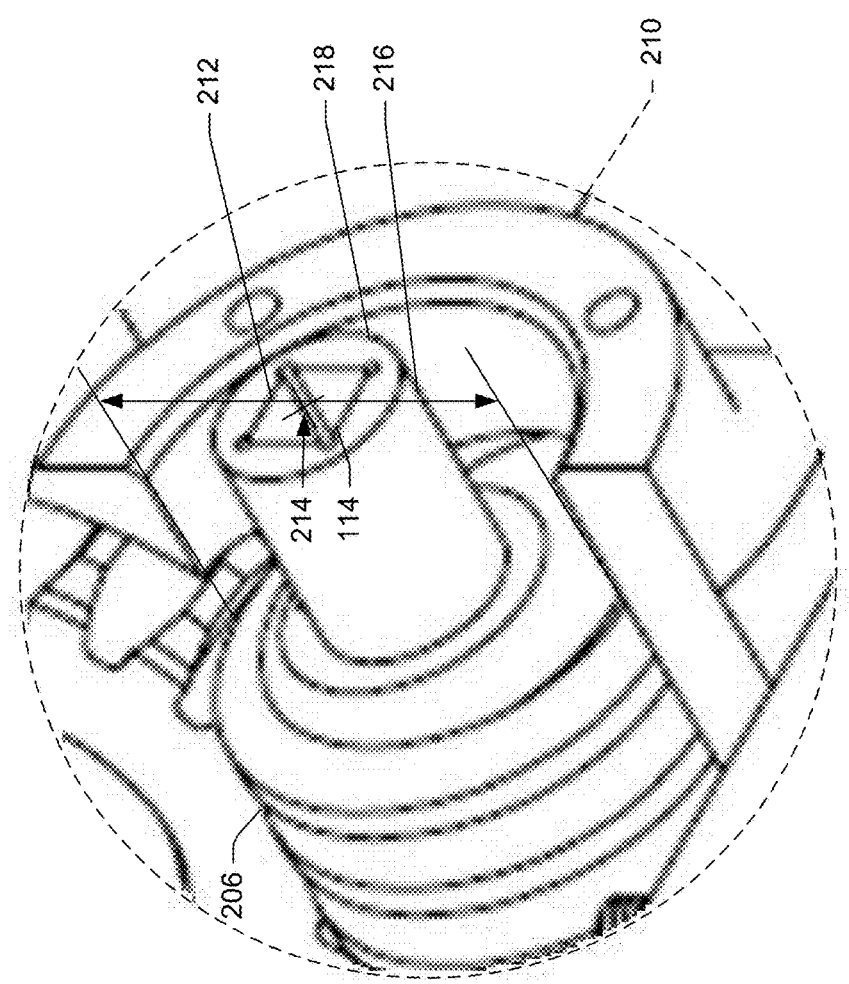

LOAD BINDER SYSTEMS

BACKGROUND

Load binders exist for securing loads on cargo-carrying vehicles. Existing ratchet type binders are time consuming to operate, inconvenient to use in a confined space and require the application of large amounts of force by the operator. For example, existing ratchet binders can take considerable amounts of time operating a lever to tighten and/or loosen a chain and when used in a confined space the operation of the lever can be severely restricted making it very difficult to tighten and/or loosen a chain.

Accordingly there remains a need in the art for improved load binders that are compact, easy to use, and do not take considerable amounts of time operating.

SUMMARY

This summary is provided to introduce simplified concepts of binders, which are further described below in the Detailed Description. This summary is not intended to identify essential features of the claimed subject matter, nor is it intended for use in determining the scope of the claimed subject matter. Binders according to this disclosure are configured to be operated with a portable rotary power driver to tighten and/or loosen a tensionable load bearing member (e.g., a chain, a cable, a strap, a rope, a rod, a tendon etc.). The binders enable a user to tighten and/or loosen a tensionable load bearing member in substantially less time than existing ratchet binders operated via a lever and the binders enable a user to tighten and/or loosen the tensionable load bearing member in confined spaces.

In one example, a binder includes a worm drive having a worm interfacing with a gear. The worm can have a receptacle arranged at a center of a diameter of the worm to receive a bit of a power driver. The binder can include a gear tube that can be fixed to the gear. The gear tube can have a first threaded end opposite a second, reverse threaded end. A first threaded rod can be threadably coupled to the first end of the gear tube and a second threaded rod can be threadably coupled to the second end of the gear tube. The binder can include a casing having a first portion that houses the gear of the worm drive and a second portion that houses the worm of the worm drive. The second portion of the casing can have at least one aperture arranged in an end of the second portion of the casing. The binder can include a cap that covers the at least one aperture arranged in the end of the second portion of the casing and encloses the worm housed in the second portion of the casing. The cap can have an aperture arranged in the cap such that the receptacle arranged at the center of the worm of the worm drive is accessible to removeably receive a bit of the power driver. When the bit of the power driver is removeably received by the receptacle arranged at the center of the worm of the worm drive, the bit of the power driver can rotate the worm, which rotates the worm gear, which rotates the gear tube, which in turn causes the first and second threaded rods to be linearly displaced in opposing directions (i.e., contracted or extended) to tension a tensionable load bearing member and to lock the binder.

In another example, a binder can include a casing including a first portion housing a first gear and a second portion housing a second gear, the second gear interfacing with the first gear. The binder can have a receptacle arranged at a center of a diameter of the second gear and the receptacle can be exposed in an aperture of the second portion of the housing. The receptacle arranged at the center of the diameter of the second gear can receive a bit of a power driver. The binder can have a gear tube fixed perpendicular to the first gear, the gear tube having a first threaded end opposite a second threaded end. A first threaded rod can be threadably coupled to the first end of the gear tube and a second threaded rod can be threadably coupled to the second end of the gear tube. When the bit of the power driver is received by the receptacle, the bit of the power driver is positioned perpendicular to the first and second threaded rods. And, when the power driver is selectively operated, the bit of the power driver can rotate the second gear, which rotates the first gear, which rotates the gear tube, which in turn linearly displaces (i.e., contracts or extends) the first and second threaded rods perpendicular to the bit of the power driver to tension a tensionable load bearing member and to lock the binder.

In another example, binder can include a casing including a first portion housing a first gear and a second portion housing a second gear, the second gear interfacing with the first gear. The binder can include a receptacle arranged at a center of a diameter of the second gear and an aperture arranged in the second portion of the housing. The aperture arranged in the second portion of the housing such that the receptacle arranged at the center of the diameter of the second gear is accessible to receive a bit of a power driver. The binder can have a gear tube fixed perpendicular to the first gear, the gear tube having a first threaded end opposite a second threaded end. A first threaded rod can be threadably coupled to the first end of the gear tube and a second threaded rod can be threadably coupled to the second end of the gear tube. When at least a portion of the bit of the power driver is received by the receptacle arranged at the center of the diameter of the second gear, the portion of the bit of the power driver received by the receptacle can rotate the second gear, which rotates the first gear, which rotates the gear tube, which in turn linearly displaces (i.e., contracts or extends) the first and second threaded rods to tension a tensionable load bearing member and to lock the binder.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 2A illustrates a perspective view of the example binder for securing a load showing a gear assembly housed in a casing.

FIG. 2B illustrates a detail view taken about a second gear of the gear assembly housed in the casing shown in FIG. 2A.

DETAILED DESCRIPTION

Overview

Figure 1:
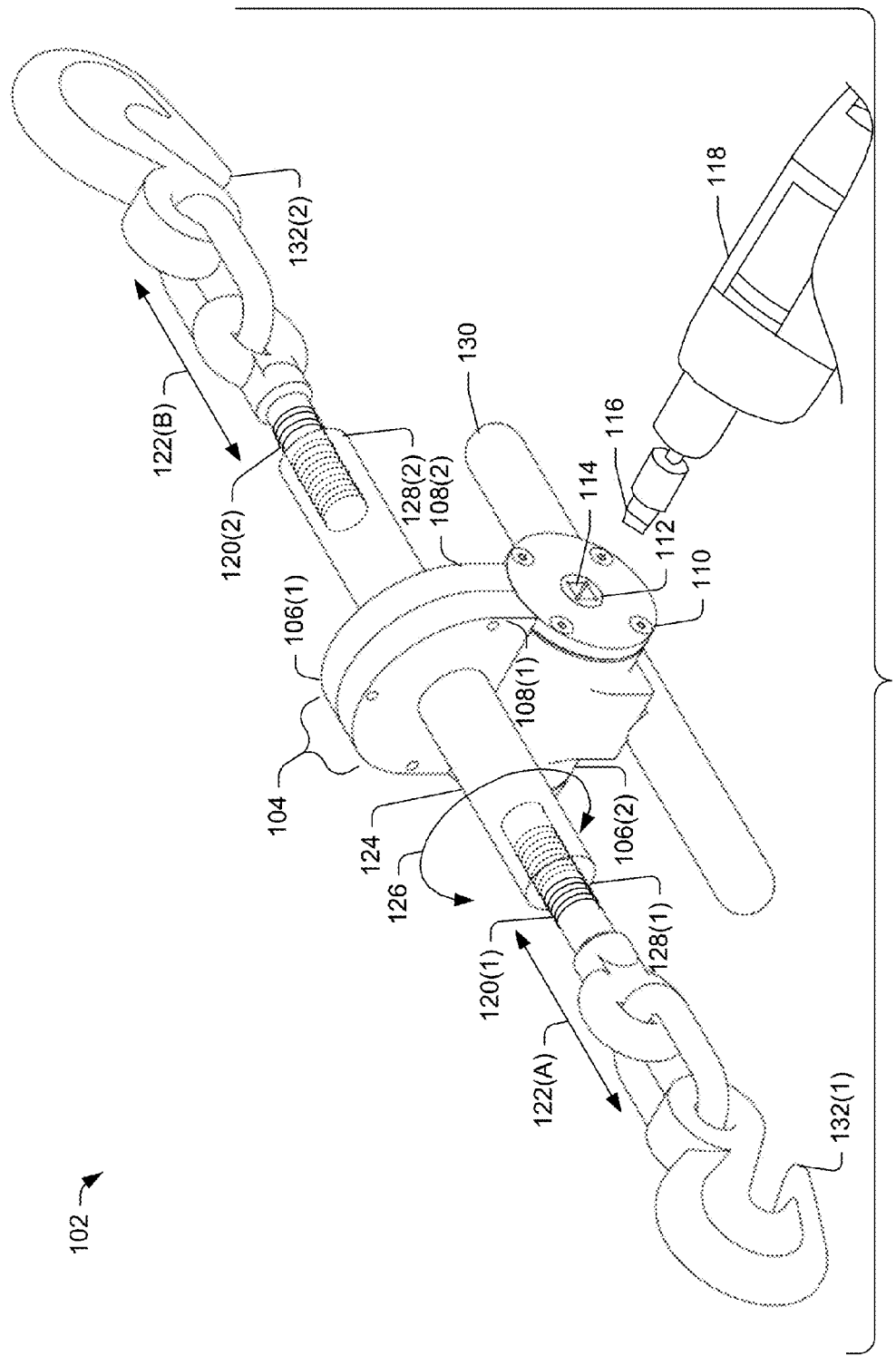
FIG. 1 illustrates a perspective view of an example binder for securing a load.

This disclosure is directed to binders that are operated with power drivers to tighten and/or loosen tensionable load bearing members in confined spaces and in substantially less time and with less force than existing ratchet binders operated via a lever. For example, the binders can include a worm drive comprising a worm interfacing with a gear. A receptacle can be arranged substantially at a center of a diameter of the worm, and the receptacle can receive a bit of a power driver (e.g., cordless drill, pistol-grip drill, hammer drill, rotary hammer drill). The binders can include a casing comprising a first portion housing the gear and a second portion housing the worm. The binders can include a cap covering an aperture arranged in an end of the second portion of the casing and enclosing the worm housed in the second portion of the casing, the cap having an aperture such that the receptacle arranged at the center of the worm is accessible to removeably receive the bit of the power driver. In some examples, the bit of the power driver removeably received by the receptacle arranged at the center of the worm tensions a tensionable load bearing member (e.g., a chain, a cable, a strap, a rope, a rod, or a tendon) and locks the binder. For example, when the power driver is selectively operated by a user, the bit of the power driver rotates the worm, which rotates the gear, which rotates a gear tube, which in turn linearly displaces (i.e., contracts or extends) first and second threaded rods to tension the tensionable load bearing member and to lock the binder. Because the binder can be operated via removeably receiving the bit of the power driver into the receptacle, the binder can be positioned into a substantially more confined space while still remaining operational as compared to existing ratchet binders which require more space to operate (e.g., displace, swing, push, pull, etc.) the lever. Moreover, because of the worm drive the power driver can operate the binder to fully tension the binder without using a lever as compared to existing ratchet binders which require a lever to fully tension existing ratchet binders. The locking of the binder can be a result of self-locking gears and threads. For example, a lead angle, a pressure angle, and a coefficient of friction between the first and second threads can prevent the first gear from driving the second gear, and a thread lead angle, a pressure angle, and a coefficient of friction between the first and second threaded rods and the first and second ends of the gear tube can prevent the gear tube from driving the threaded rods.

In another example, the binder can include a casing including a first portion housing a first gear and a second portion housing a second gear, the second gear interfacing with the first gear. A receptacle can be arranged at a center of a diameter of the second gear and exposed in an aperture of the second portion of the housing to receive a bit of a power driver. The bit of the power driver can be received by the receptacle perpendicular to first and second threaded rods and linearly displace the first and second threaded rods perpendicular to the bit of the power driver to tension a tensionable load bearing member and lock the binder.

In another example, the binder can include a casing including a first portion housing a first gear and a second portion housing a second gear, the second gear interfacing with the first gear. An aperture can be arranged in the second portion of the housing such that a receptacle arranged at the center of the diameter of the second gear is accessible to receive a bit of a power driver to linearly displace first and second threaded rods. For example, the aperture can be arranged in the second portion of the housing such that at least a portion of the bit of the power driver is received by the receptacle arranged at the center of the diameter of the second gear to rotatably displace the second gear and linearly displace the first and second threaded rods when the power driver is selectively operated.

These and other aspects of the binders will be discussed below with reference to the figures.

Illustrative Binders

FIG. 1 illustrates a perspective view 100 of an example binder 102 for securing a load (e.g., equipment, containers, material, vehicles, etc.). The binder 102 can include a casing 104 including a first portion 106(1) and a second portion 106(2). The first portion 106(1) can house a first gear and the second portion 106(2) can house a second gear, where the second gear interfaces with the first gear (discussed in more detail below with regard to FIG. 2A). The casing 104 can include a left housing 108(1) and a right housing 108(2).

The binder 102 can include a cap 110 enclosing the second gear housed in the second portion 106(2) of the casing 104. FIG. 1 illustrates the cap 110 can have an aperture 112 such that a receptacle 114 arranged at a center of the second gear is accessible to removeably receive a bit 116 (e.g., adapter) of a power driver 118. While FIG. 1 illustrates the binder 102 having a cap 110, in other examples the binder may not have a cap 110. In the example where the binder 102 does not include a cap 110, an aperture can be arranged in the second portion 106(2) of the casing 104 such that the receptacle 114 arranged at the center of the diameter of the second gear is accessible to receive the bit 116 of the power driver 118. Further, while FIG. 1 illustrates one receptacle 114 arranged at a center of the second gear, the binder 102 can include a second receptacle arranged at the center of the second gear opposite to the receptacle 114. For example, the binder 102 can include a first receptacle opposite a second receptacle, the first and second receptacles arranged at the center of the second gear and accessible to receive the bit 116 of the power driver 118 on opposite sides of the binder 102. The opposing receptacles providing more accessibility for the power driver 118 to operate the binder 102 in confined or tight spaces.

When the bit 116 of the power driver 118 is removeably received by the receptacle 114, and a user selectively operates (e.g., switches on, triggers on, turns on) the power driver 118 the bit 116 of the power driver 118 rotates the receptacle, which rotates the second gear, which rotates the first gear, which rotates a gear tube (described in detail below), which in turn linearly displaces (i.e., contracts or extends) first and second threaded rods 120(1) and 120(2) (internal threads shown in dashed lines) in the linear directions 122(A) and 122(B) to tension (e.g., tighten) and/or loosen a tensionable load bearing member (not shown) and lock the binder 102. The gear tube rotates relative to the threaded rods 120(1) and 120(2), which causes the threaded rods 120(1) and 120(2) to contract into the gear tube, tensioning the binder 102, or the rotating gear tube causes the threaded rods 120(1) and 120(2) to extend out of the gear tube, loosening the binder 102. The locking of the binder 102 can be a result of a lead angle, a pressure angle, and a coefficient of friction between the first and second gears that prevent the first gear from driving the second gear, and a lead angle, a pressure angle, and a coefficient of friction between the first and second threaded rods and the first and second ends of the gear tube can prevent the gear tube from driving the threaded rods.

Further, when the power driver 118 is selectively operated, the linear direction 122(A) of the first threaded rod 120(1) may be opposite to the linear direction 122(B) of the second threaded rod 120(2). For example, when the power driver 118 is selectively operated to tighten a tensionable load bearing member the linear direction 122(A) of the first threaded rod 120(1) may be in a linear direction out away from the casing 104 and the linear direction 122(B) of the second threaded rod 120(2) may also be out away from the casing 104. Similarly, when the power driver 118 is selectively operated to loosen a tensionable load bearing member the linear direction 122(A) of the first threaded rod 120(1) may be in a linear direction toward the casing 104 and the linear direction 122(B) of the second threaded rod 120(2) may also be toward the casing 104.

FIG. 1 illustrates the binder 102 can include a gear tube 124 fixed to the first gear housed in the first portion 106(1) of the casing 104, and when the power driver 118 is selectively operated the bit 116 can rotate the gear tube 124 in a direction 126. The direction 126 the gear tube 124 rotates can be clockwise or counter clock wise depending on a rotational direction of the bit 116 of the power driver 118. FIG. 1 also illustrates the first threaded rod 120(1) threadably coupled to a first end 128(1) of the gear tube 124 and the second threaded rod 120(2) threadably coupled to a second end 128(2) of the gear tube 124. Thus, when the power driver 118 is selectively operated to tighten or loosen a tensionable load bearing member the gear tube 124 rotates in the direction 126 and the rotating gear tube 124 linearly displaces the first threaded rod 120(1) in the linear direction 122(A) and linearly displaces the second threaded rod 120(2) in the linear direction 122(B).

Because the binder 102 is operated with the power driver 118 to tighten and/or loosen a tensionable load bearing member by linearly displacing the first and second threaded rods 120(1) and 120(2), the binder 102 can tighten and/or loosen a tensionable load bearing member in substantially less time than existing ratchet binders operated via a lever. Moreover, because the binder 102 is operated with the power driver 118 to tighten and/or loosen a tensionable load bearing member by linearly displacing the first and second threaded rods 120(1) and 120(2), the binder 102 can be operated in confined spaces. For example, because the binder 102 can be operated via removeably receiving the bit 116 of the power driver 118 into the receptacle 114, the binder 102 can be positioned into a substantially more confined space while still remaining operational as compared to existing ratchet binders which require more space to operate (e.g., displace, swing, push, pull, etc.) the lever.

The binder 102 can include a handle 130 fixed the casing 104. The handle 130 provides a gripping location for a user to prevent the gear assembly housed in the casing 104 from rotatably displacing (i.e., twisting) relative to the first and second threaded rods 120(1) and 120(2).

While FIG. 1 illustrates the binder 102 having hooks 132(1) and 132(2) coupled to ends of the first and second threaded rods 120(1) and 120(2) for removeably coupling the binder 102 to a tensionable load bearing member, the binder 102 can have a clasp, a buckle, a clip, a pin, a carabiner, a ring, a strap, etc. coupled to an end of the first threaded rod 120(1) or to an end of the second threaded rod 120(2) for removeably coupling the binder 102 to a tensionable load bearing member.

The casing 104 can be formed of metal, plastic, composite, etc. In one example, the casing 104 can comprise the left and right housings 108(1) and 108(2) machined from metal, plastic, composite, etc. In another example, the casing 104 can comprise left and right housings 108(1) and 108(2) cast from metal, plastic, composite, ceramic, etc.

The binder 102 may meet Web Sling & Tie Down Association (WSTDA) T-6 standards.

FIG. 2A illustrates a perspective view 200 of the example binder 102 for securing a load shown in FIG. 1 with the left housing 108(1) of the casing 104 and the cap 110 not shown. FIG. 2A shows a gear assembly 202 housed in the right housing 108(2) of the casing 104. The gear assembly 202 can include a first gear 204 interfacing with a second gear 206. FIG. 2A illustrates the first portion 106(1) of the casing 104 housing the first gear 204 and the second portion 106(2) of the casing 104 housing the second gear 206. While FIG. 2A illustrates the gear assembly 202 comprising a worm drive having a worm or worm screw (e.g., second gear 206) interfacing with a gear or worm wheel (e.g., first gear 204), the gear assembly 202 may comprise other types of gear assemblies. For example, the gear assembly 202 can comprise right angled interfacing gears. In the example where the gear assembly 202 comprises a worm drive the binder 102 may be operated via a battery powered hand driver. The battery powered hand driver can comprise a 4 Volt, an 8 Volt, a 12 Volt, 18 Volt, 20 Volt, etc. battery operated compact driver. In other examples, the binder 102 may be operated via an AC powered hand driver (e.g., 7 A, 120V hand driver), a pneumatic driver, a hydraulic driver, removable lever or other drivers.

FIG. 2A illustrates the second portion 106(2) of the casing 104 having an aperture 208 arranged in an end of the second portion 106(2) of the casing 104. The cap 110 can be arranged to enclose the second gear 206 housed in the second portion 106(2) of the casing 104. While FIG. 2A illustrates one aperture arranged in one end of the second portion 106(2) of the casing 104, the second portion 106(2) may have a second aperture arranged in another end of the second portion 106(2) of the casing 104. Moreover, another cap (e.g., a second cap) could be arranged to couple to the second aperture and enclose the second gear 206 housed in the second portion 106(2) of the casing 104. The cap 110 can be coupled to the aperture 208 and provide for resisting radial and axial forces applied by the second gear 206 when the binder 102 is operated.

FIG. 2A illustrates the gear tube 124 fixed to the first gear 204. In one example, the gear tube 124 may comprise a separate unit of material pinned, welded, glued, press-fit, snap-fit, screwed, thermally bonded, etc. to the first gear 204. In another example, the gear tube 124 and the first gear 204 may comprise one single unit of material.

FIG. 2A illustrates the gear tube 124 can be fixed perpendicular to the first gear 204, the first and second threaded bars 120(1) and 120(2) can be collinear to the gear tube 124, and the second gear 206 can be perpendicular to the gear tube 124 and the first and second threaded bars 120(1) and 120(2). Thus, the bit 116 of the power driver 118 can be received by the receptacle 114 perpendicular to the first and second threaded rods 120(1) and 120(2). Moreover, when the power driver 118 is selectively operated, the bit 116 of the power driver 118 can linearly displace the first and second threaded rods 120(1) and 120(2) perpendicular to the bit 116 of the power driver 118 to tension a tensionable load bearing member and lock the binder 102. For example, when the power driver 118 is selectively operated, the bit 116 of the power driver 118 can linearly displace the first and second threaded rods 120(1) and 120(2) to draw the hooks 132(1) and 132(2) towards each other, tensioning the tensionable load bearing member. Because the power driver 118 is arranged substantially perpendicular to the first and second threaded rods 120(1) and 120(2) arranged substantially collinear with the tensionable load bearing member, portions (e.g., wrist, hands, forearm, elbow, shoulder, etc.) of a user are subjected to little or no torsion about the first and second threaded rods 120(1) and 120(2). This is because the bit 116 of the power driver 118 rotates perpendicular to the rotational direction 126 of threaded bar 124 linearly displacing the first and second threaded rods 120(1) and 120(2) in opposing directions collinear with the tensioned tensionable load bearing member.

Further, when the power driver 118 is selectively operated, the bit 116 of the power driver 118 can linearly displace the first and second threaded rods 120(1) and 120(2) to draw the hooks 132(1) and 132(2) towards each other, locking the first gear 204 together with the second gear 206, and locking the first and second threaded rods 120(1) and 120(2) together with the first and second ends 128(1) and 128(2) of the gear tube 124. For example, the first gear 204 and the second gear 206 can be self-locking, and the first and second threaded rods 120(1) and 120(2) and the first and second ends 128(1) and 128(2) of the gear tube 124 can be self-locking. For example, the lead angle, the pressure angle, and the coefficient of friction between the first and second gears 204 and 206 prevent the first gear 204 from driving the second gear 206, and the lead angle, the pressure angle, and the coefficient of friction between the first and second threaded rods 120(1) and 120(2) and the first and second ends 128(1) and 128(2) of the gear tube 124 prevent the gear tube 124 from driving the threaded rods 120(1) and 120(2).

The first gear 204 can have an outside diameter of about 2.78 inches, a bore diameter of about 0.75 inches, a face of about 0.75 inches, a pitch diameter of about 2.5 inches, a pressure angle of about 14.5 degrees, and a tooth count of about 20 teeth. The second gear 206 can have an outside diameter of about 1.75 inches, a bore diameter of about 0.75 inches, a face of about 1.75 inches, a length of about 2.5 inches, a pitch diameter of about 1.5 inches, and a pressure angle of about 14.5 degrees.

FIG. 2A illustrates a detail view 210 taken about the second gear 206.

FIG. 2B illustrates the detail view 210 taken about the second gear 206 and shows the second gear 206 having an outside diameter 212 and the receptacle 114 arranged substantially at a center 214 of the outside diameter 212 of the second gear 206. FIG. 2 illustrates a shaft 216 fixed substantially at the center 214 of the outside diameter 212 of the second gear 206. Detail view 210 shows the shaft 216 can have the receptacle 114 arranged in an end 218 of the shaft 216 substantially at the center 214 of the diameter 212 of the second gear 206. In one example, the shaft 216 can comprises a keyed shaft formed of a separate unit of material that is pinned, welded, glued, press-fit, snap-fit, screwed, thermally bonded, etc. to the second gear 206. In another example, the shaft 216 and the second gear 206 can be one single unit of material.

While detail view 210 shows the receptacle 114 having a square geometry, the receptacle 114 may have a hex geometry, a star geometry, triangle geometry, lobe geometry, etc. The receptacle 114 can provide for securing, safeguarding, locking, tamper-proofing etc. the binder 102. For example, the geometry of receptacle 114 can comprise a proprietary shape that receives the bit 116 having a proprietary shape that cooperates with the proprietary shape of the receptacle 114. In some example, the bit 116 having the proprietary shape that cooperates with proprietary shape of the receptacle 114 can be made available only to users who own (e.g., registered owners) a binder 102 having the receptacle 114 having the proprietary shape. In this way, the operation of the binder 102 can be confined to owners and made unavailable to the average layperson to provide for securing, safeguarding, locking, tamper-proofing, etc. the binder 102.

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention. For example, while embodiments are described having certain shapes, sizes, and configurations, these shapes, sizes, and configurations are merely illustrative.

What is claimed is:

1. A binder for securing a load, the binder comprising:
   a worm drive including a worm screw interfacing with a worm wheel, the worm screw having: a length of about 2.5 inches, a pitch diameter of about 1.5 inches, and a pressure angle of about 14.5 degrees, the worm wheel having: an outside diameter of about 2.78 inches, a bore diameter of about 0.75 inches, a face of about 0.75 inches, a pitch diameter of about 2.5 inches, the pressure angle of about 14.5degrees, and a tooth count of about 20 teeth;
   a receptacle arranged substantially at a center of the outside diameter of the worm screw, the receptacle to receive a bit of a battery powered hand driver and configured to rotate the worm screw, the receptacle and the bit having a shape proprietary to an owner of the binder for safeguarding the binder;
   a gear tube fixed to the worm wheel, the gear tube having a threaded end;
   a threaded rod threadably coupled to the threaded end of the gear tube;
   a casing including a first portion housing the worm wheel and a second portion housing the worm screw such that the length of about 2.5 inches of the worm screw crosses the gear tube, the second portion of the casing having at least one aperture arranged in an end of the second portion of the casing;
   a cap covering the at least one aperture arranged in the end of the second portion of the casing and enclosing the worm screw housed in the second portion of the casing, the cap having an aperture through which the receptacle at the center of the worm screw is accessible to removeably receive the bit of the battery powered hand driver; and
   wherein rotation of the receptacle arranged at the center of the worm screw causes linear displacement of the threaded rod to tension the binder.

2. The binder of claim 1, further comprising a shaft fixed substantially at the center of the outside diameter of the worm screw, the shaft having the receptacle arranged in an end of the shaft substantially at the center of the outside diameter of the worm screw.

3. The binder of claim 1, wherein rotation of the receptacle arranged at the center of the worm screw causes linear displacement of the threaded rod to tension the binder and lock the binder.

4. The binder of claim 1, wherein the receptacle arranged at the center of the worm screw comprises a hex geometry, a star geometry, triangle geometry, or lobe geometry.

5. The binder of claim 1, further comprising a handle fixed to the casing for preventing the casing from rotatably displacing relative to the threaded rod.

6. The binder of claim 1, further comprising a hook coupled to an end of the threaded rod, the hook for removeably coupling the binder to a tensionable load bearing member.

7. The binder of claim 1, wherein the tensionable load bearing member comprises a chain, a cable, a strap, a rope, or a tendon.

8. A binder comprising:
   a casing including a first portion housing a worm wheel and a second portion housing a worm screw, the worm screw interfacing with the worm wheel, the worm screw having: an outside diameter of about 1.75 inches, a bore diameter of about 0.75 inches, a face of about 1.75 inches, a length of about 2.5 inches, a pitch diameter of about 1.5 inches, and a pressure angle of about 14.5 degrees, the worm wheel having: an outside diameter of about 2.78 inches, a bore diameter of about 0.75 inches, a face of about 0.75 inches, a pitch diameter of about 2.5 inches, the pressure angle of about 14.5 degrees, and a tooth count of about 20 teeth;

a receptacle arranged at a center of the outside diameter of the worm screw and exposed in an aperture of the second portion of the casing, the receptacle to receive a bit of a battery powered hand driver and configured to rotate the worm screw, the receptacle and the bit having a shape proprietary to an owner of the binder for safeguarding the binder;

a gear tube fixed perpendicular to the worm wheel, the gear tube having a first threaded end opposite a second threaded end and the length of about 2.5 inches of the worm screw crosses the gear tube;

a first threaded rod threadably coupled to the first end of the gear tube and a second threaded rod threadably coupled to the second end of the gear tube; and wherein the receptacle to receive the bit of the battery powered hand driver is disposed perpendicular to the first and second threaded rods, and rotation of the receptacle by the bit of the battery powered hand driver rotates the gear tube, which linearly displaces the first and second threaded rods perpendicular to the bit of the battery powered hand driver to tension the binder.

9. The binder of claim 8, wherein the worm screw interfaces with the worm wheel substantially perpendicular to the first and second threaded rods.

10. The binder of claim 8, further comprising a handle fixed to the casing for preventing the worm gear from rotatably displacing relative to the first and second threaded rods.

11. The binder of claim 8, further comprising a first hook coupled to an end of the first threaded rod and a second hook coupled to an end of the second threaded rod, the first and second hooks for removeably coupling the binder to the tensionable load bearing member including a chain, a cable, a strap, a rope, or a tendon.

12. The binder of claim 8, wherein rotation of the receptacle by the bit of the battery powered hand driver rotates the gear tube, which linearly displaces the first and second threaded rods perpendicular to the bit of the battery powered hand driver to tension the binder and lock the binder.

13. A binder comprising:
a casing including:
a first portion housing a worm wheel, the worm wheel having an outside diameter of about 2.78 inches, a bore diameter of about 0.75 inches, a face of about 0.75 inches, a pitch diameter of about 2.5 inches, a pressure angle of about 14.5 degrees, and a tooth count of about 20 teeth; and a second portion housing a worm screw, the worm screw interfacing with the worm wheel and having an outside diameter of about 1.75 inches, a bore diameter of about 0.75 inches, a face of about 1.75 inches, a length of about 2.5 inches, a pitch diameter of about 1.5inches, and the pressure angle of about 14.5 degrees;

a receptacle arranged at a center of the outside diameter of the worm screw and arranged to rotate the worm screw;

an aperture arranged in the second portion of the casing such that the receptacle arranged at the center of the outside diameter of the worm screw is accessible to receive a bit of a battery powered hand driver;

a gear tube fixed perpendicular to the worm wheel, the gear tube having a first threaded end opposite a second threaded end and the length of about 2.5 inches of the worm screw crosses the gear tube;

a first threaded rod threadably coupled to the first end of the gear tube and a second threaded rod threadably coupled to the second end of the gear tube; and wherein at least a portion of the bit of the battery powered hand driver is received by the receptacle arranged at the center of the outside diameter of the worm screw, the portion of the bit of the battery powered hand driver received by the receptacle rotates the worm screw and the gear tube to linearly displace the first and second threaded rods, and the receptacle and the bit having a shape proprietary to an owner of the binder for safeguarding the binder.

14. The binder of claim 13, further comprising a handle fixed to the first portion or the second portion of the casing for preventing the casing from rotatably displacing relative to the first and second threaded rods.

15. The binder of claim 13, further comprising a hook, a clasp, a buckle, a clip, a pin, a carabiner, a ring, or a strap coupled to an end of the first threaded rod or to an end of the second threaded rod for removeably coupling the binder to a tensionable load bearing member including a chain, a cable, a strap, a rope, or a tendon.

16. The binder of claim 13, wherein the portion of the bit of the battery powered hand driver received by the receptacle rotates the worm screw and the gear tube to linearly displace the first and second threaded rods and lock the binder.

* * * * *